United States Patent [19]
Arunachalam

[11] Patent Number: 5,987,500
[45] Date of Patent: *Nov. 16, 1999

[54] VALUE-ADDED NETWORK SYSTEM FOR ENABLING REAL-TIME, BY-DIRECTIONAL TRANSACTIONS ON A NETWORK

[75] Inventor: Lakshmi Arunachalam, Menlo Park, Calif.

[73] Assignee: Pi-Net International, Inc., Menlo Park, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/879,958

[22] Filed: Jun. 20, 1997

Related U.S. Application Data

[62] Division of application No. 08/700,726, Aug. 5, 1996, Pat. No. 5,778,178
[60] Provisional application No. 60/006,634, Nov. 13, 1995.

[51] Int. Cl.[6] ........................................................ G06F 13/00
[52] U.S. Cl. ............................................................ 709/203
[58] Field of Search ........................ 364/DIG. 1, DIG. 2; 395/762, 200.3, 200.31, 200.32, 200.43, 681, 682, 683, 684, 685, 689; 709/200, 201, 202, 203, 213, 301, 302, 303, 304, 305; 710/200

[56] References Cited

PUBLICATIONS

"Coding with HTML forms: HTML goes interactive", Andrew Davidson, Dr. Dobb's Journal, V20, N6, Jun. 1995, p. 16.

*Primary Examiner*—Robert B. Harrell
*Attorney, Agent, or Firm*—Blakely, Sokoloff, Taylor & Zafman LLP

[57] ABSTRACT

The present invention provides a method and apparatus for providing real-time, two-way transactional capabilities on the Web. Specifically, one embodiment of the present invention discloses a configurable value-added network switch for enabling real-time transactions on the World Wide Web. The configurable value added network switch comprises a system for switching to a transactional application in response to a user specification from a World Wide Web application, a system means for transmitting a transaction request from the transactional application, and a system for processing the transaction request. Additionally, a method for enabling object routing is disclosed, comprising the steps of creating a virtual information store containing information entries and attributes associating each of the information entries and the attributes with an object identity, and assigning a unique network address to each of the object identities. Finally, a method is disclosed for enabling service management of the value-added network service, to perform OAM&P functions on the services network.

35 Claims, 13 Drawing Sheets

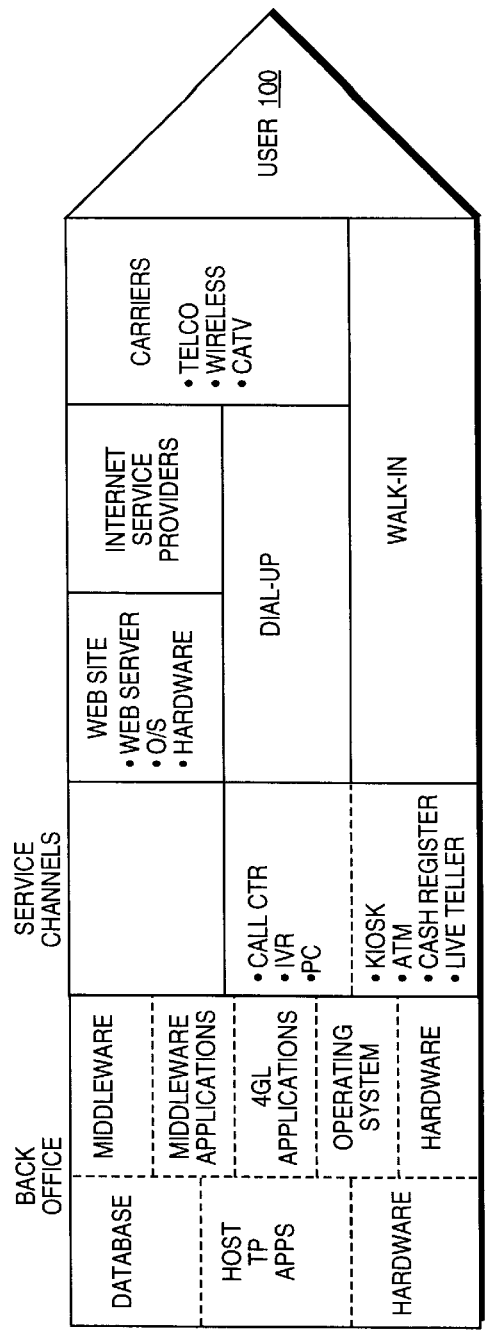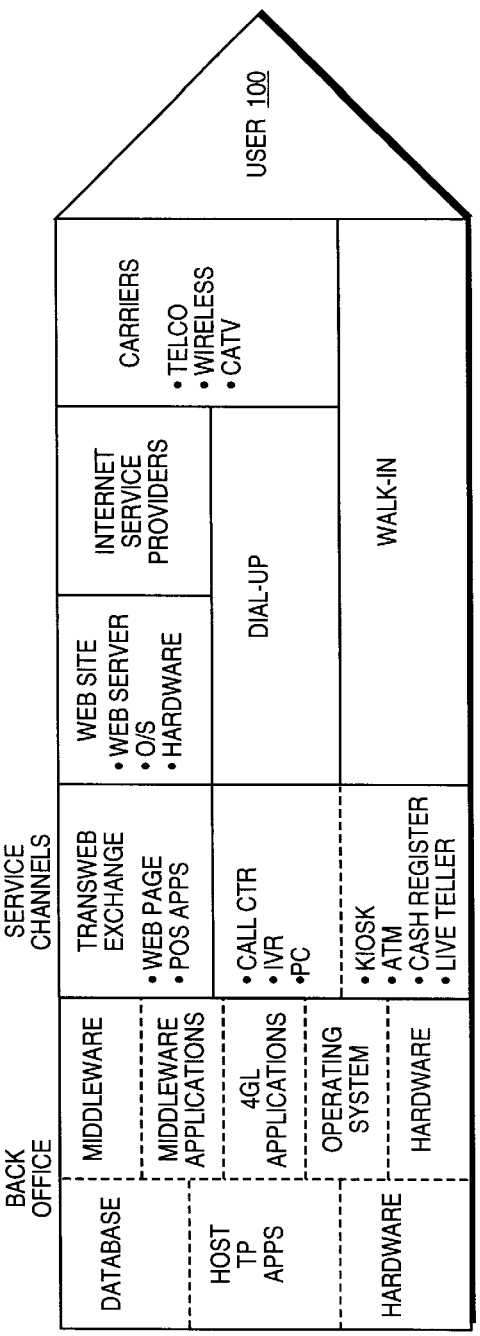

5,987,500

VALUE-ADDED NETWORK SYSTEM FOR ENABLING REAL-TIME, BY-DIRECTIONAL TRANSACTIONS ON A NETWORK

RELATED APPLICATIONS

This is a divisional of application Ser. No. 08/700,726, filed Aug. 5, 1996, now U.S. Pat. No. 5,778,178.

FIELD OF THE INVENTION

The present invention relates to the area of Internet communications. Specifically, the present invention relates to a method and apparatus for configurable value-added network switching and object routing.

BACKGROUND OF THE INVENTION

With the Internet and the World Wide Web ("the Web") evolving rapidly as a viable consumer medium for electronic commerce, new on-line services are emerging to fill the needs of on-line users. An Internet user today can browse on the Web via the use of a Web browser. Web browsers are software interfaces that run on Web clients to allow access to Web servers via a simple user interface. A Web user's capabilities today from a Web browser are, however, extremely limited. The user can perform one-way, browse-only interactions. Additionally, the user has limited "deferred" transactional capabilities, namely electronic mail (e-mail) capabilities. E-mail capabilities are referred to as "deferred transactions" because the consumer's request is not processed until the e-mail is received, read, and the person or system reading the e-mail executes the transaction. This transaction is thus not performed in real-time.

FIG. 1A illustrates typical user interactions on the Web today. User 100 sends out a request from Web browser 102 in the form of a universal resource locator (URL) 101 in the following manner: http://www.car.com. URL 101 is processed by Web browser 102 that determines the URL corresponds to car dealer Web page 105, on car dealer Web server 104. Web browser 102 then establishes browse link 103 to car dealer Web page 105. User 100 can browse Web page 105 and select "hot links" to jump to other locations in Web page 105, or to move to other Web pages on the Web. This interaction is typically a browse-only interaction. Under limited circumstances, the user may be able to fill out a form on car dealer Web page 105, and e-mail the form to car dealer Web server 104. This interaction is still strictly a one-way browse mode communications link, with the e-mail providing limited, deferred transactional capabilities.

Under limited circumstances, a user may have access to two-way services on the Web via Common Gateway Interface (CGI) applications. CGI is a standard interface for running external programs on a Web server. It allows Web servers to create documents dynamically when the server receives a request from the Web browser. When the Web server receives a request for a document, the Web server dynamically executes the appropriate CGI script and transmits the output of the execution back to the requesting Web browser. This interaction can thus be termed a "two-way" transaction. It is a severely limited transaction, however, because each CGI application is customized for a particular type of application or service.

For example, as illustrated in FIG. 1B, user 100 may access bank 150's Web server and attempt to perform transactions on checking account 152 and to make a payment on loan account 154. In order for user 100 to access checking account 152 and loan account 154 on the Web, CGI application scripts must be created for each account, as illustrated in FIG. 1B. The bank thus has to create individual scripts for each of its services to offer users access to these services. User 100 can then interact in a limited fashion with these individual applications. Creating and managing individual CGI scripts for each service is not a viable solution for merchants with a large number of services.

As the Web expands and electronic commerce becomes more desirable, the need increases for robust, real-time, bi-directional transactional capabilities on the Web. A true real-time, bi-directional transaction would allow a user to connect to a variety of services on the Web, and perform real-time transactions on those services. For example, although user 100 can browse car dealer Web page 105 today, the user cannot purchase the car, negotiate a car loan or perform other types of real-time, two-way transactions that he can perform with a live salesperson at the car dealership. Ideally, user 100 in FIG. 1A would be able to access car dealer Web page 105, select specific transactions that he desires to perform, such as purchase a car, and perform the purchase in real-time, with two-way interaction capabilities. CGI applications provide user 100 with a limited ability for two-way interaction with car dealer Web page 105, but due to the lack of interaction and management between the car dealer and the bank, he will not be able to obtain a loan and complete the purchase of the car via a CGI application. The ability to complete robust real-time, two-way transactions is thus not truly available on the Web today.

SUMMARY OF THE INVENTION

It is therefore an object of the present invention to provide a method and apparatus for providing real-time, two-way transactional capabilities on the Web. Specifically, one embodiment of the present invention discloses a configurable value-added network switch for enabling real-time transactions on the World Wide Web. The configurable value added network switch comprises means for switching to a transactional application in response to a user specification from a World Wide Web application, means for transmitting a transaction request from the transactional application, and means for processing the transaction request.

According to another aspect of the present invention, a method and apparatus for enabling object routing on the World Wide Web is disclosed. The method for enabling object routing comprises the steps of creating a virtual information store containing information entries and attributes, associating each of the information entries and the attributes with an object identity, and assigning a unique network address to each of the object identities.

Other objects, features and advantages of the present invention will be apparent from the accompanying drawings and from the detailed description.

BRIEF DESCRIPTION OF THE DRAWINGS

The features and advantages of the present invention will be apparent from the accompanying drawings and from the detailed description of the present invention as set forth below.

FIG. 4A illustrates conceptually the user value chain as it exists today.

FIG. 4B illustrates one embodiment of the present invention.

DETAILED DESCRIPTION OF THE PREFERRED EMBODIMENT

The present invention relates to a method and apparatus for configurable value-added network switching and object routing and management. "Web browser" as used in the context of the present specification includes conventional Web browsers such as NCSA Mosaic™ from NCSA and Netscape Mosaic™ from Netscape™. The present invention is independent of the Web browser being utilized and the user can use any Web browser, without modifications to the Web browser. In the following detailed description, numerous specific details are set forth in order to provide a thorough understanding of the present invention. It will be apparent to one of ordinary skill in the art, however, that these specific details need not be used to practice the present invention. In other instances, well-known structures, interfaces and processes have not been shown in detail in order not to unnecessarily obscure the present invention.

Figure 1A:
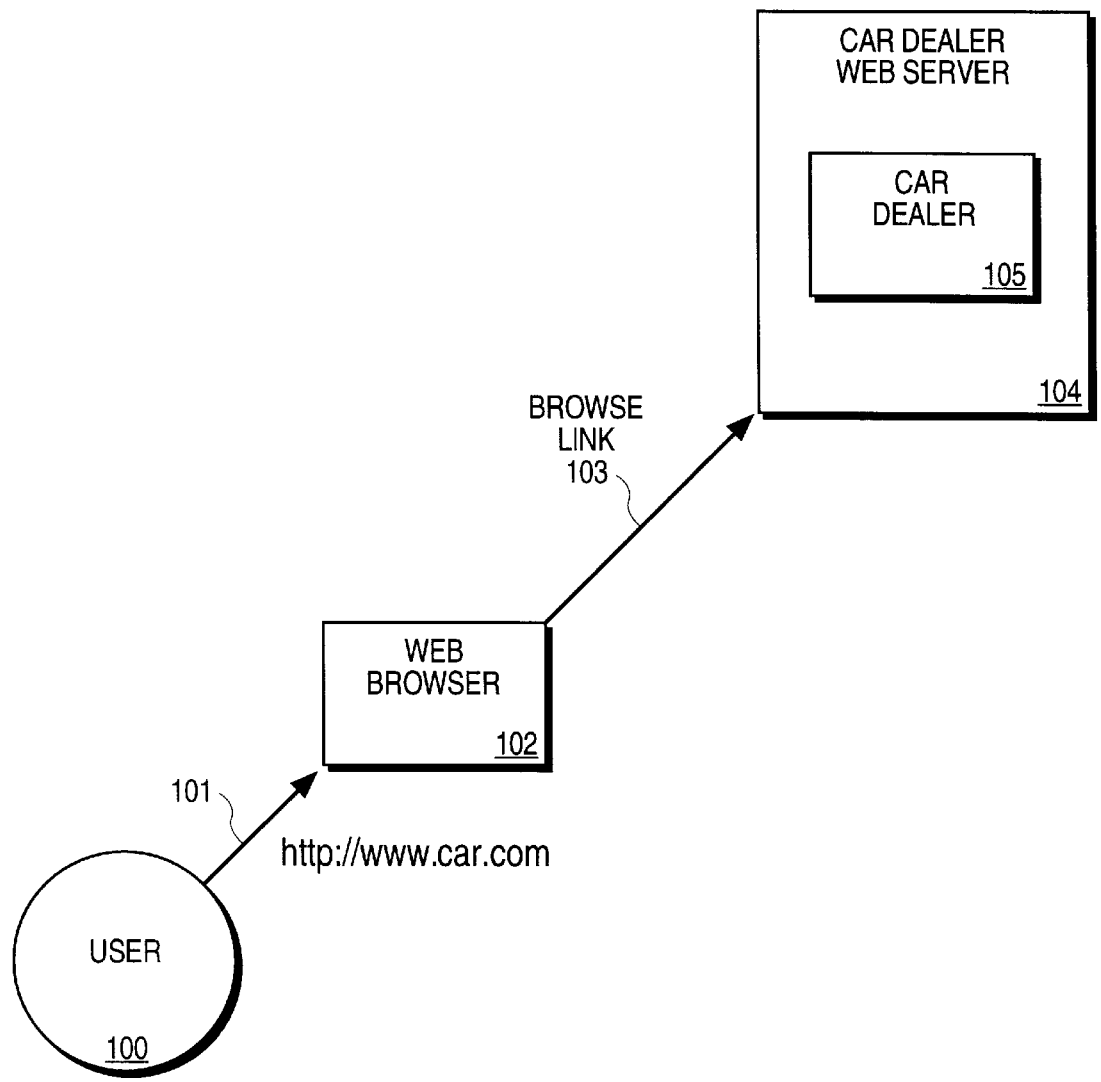
FIG. 1A is an illustration of a current user's browse capabilities on the Web via a Web browser.
Figure 1B:
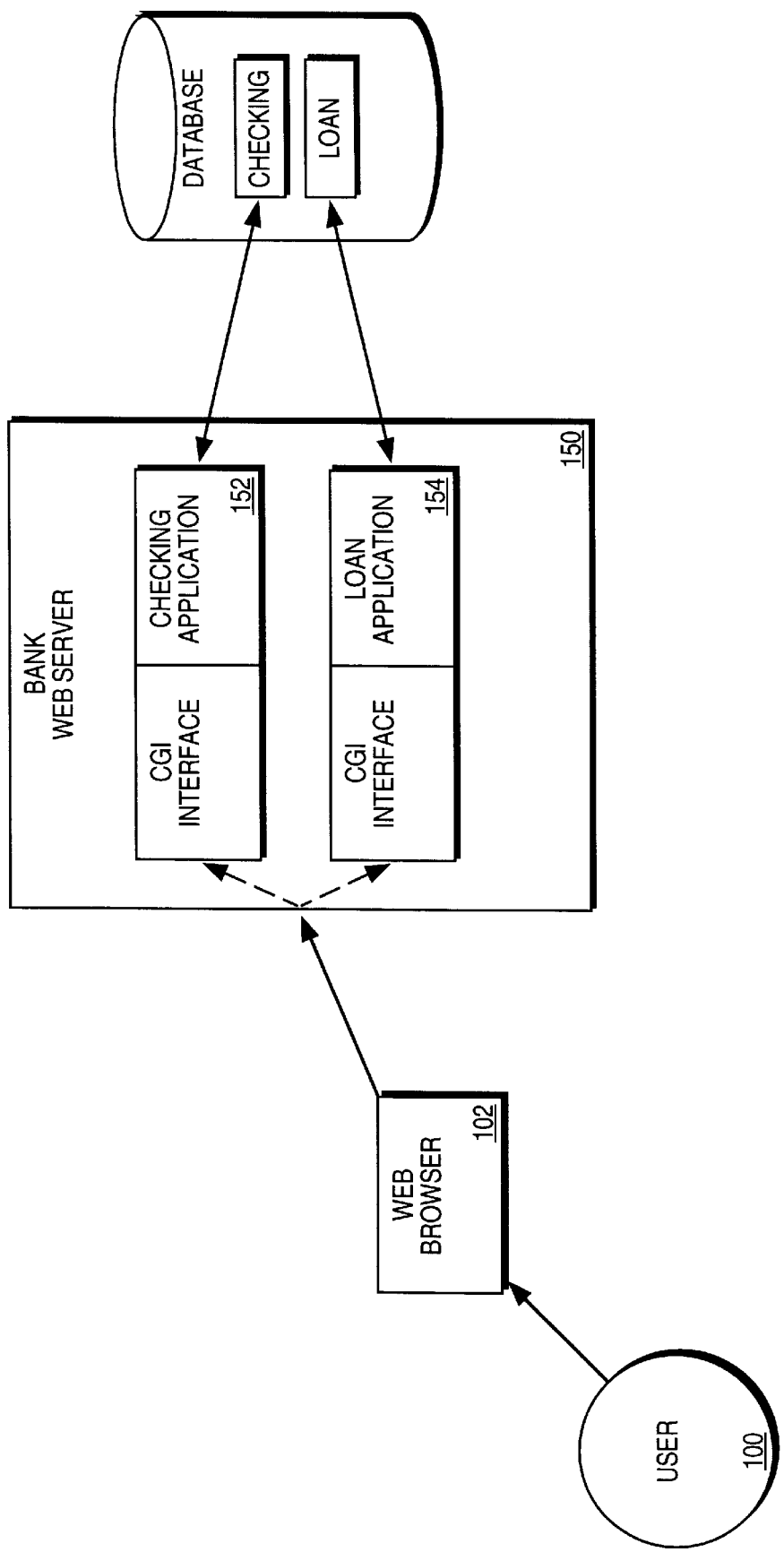
FIG. 1B is an illustration of a current user's capabilities to perform limited transactions on the Web via CGI applications.
Figure 2:
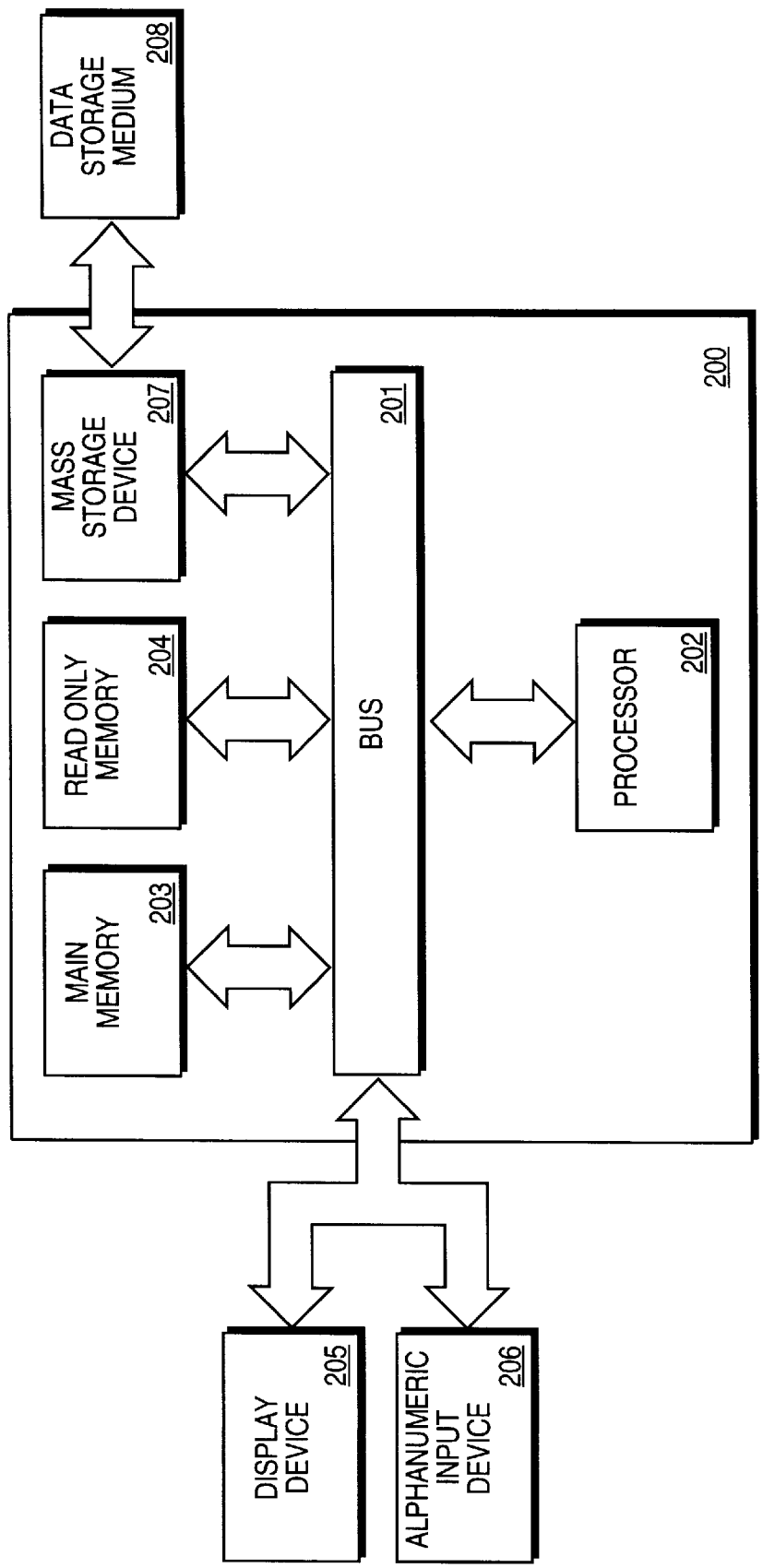
FIG. 2 illustrates a typical computer system on which the present invention may be utilized.

FIG. 2 illustrates a typical computer system 200 in which the present invention operates. The preferred embodiment of the present invention is implemented on an IBM™ Personal Computer manufactured by IBM Corporation of Armonk, N.Y. Alternate embodiments may be implemented on a Macintosh™ computer manufactured by Apple™ Computer, Incorporated of Cupertino, Calif. It will be apparent to those of ordinary skill in the art that other alternative computer system architectures may also be employed.

In general, such computer systems as illustrated by FIG. 2 comprise a bus 201 for communicating information, a processor 202 coupled with the bus 201 for processing information, main memory 203 coupled with the bus 201 for storing information and instructions for the processor 202, a read-only memory 204 coupled with the bus 201 for storing static information and instructions for the processor 202, a display device 205 coupled with the bus 201 for displaying information for a computer user, an input device 206 coupled with the bus 201 for communicating information and command selections to the processor 202, and a mass storage device 207, such as a magnetic disk and associated disk drive, coupled with the bus 201 for storing information and instructions. A data storage medium 208 containing digital information is configured to operate with mass storage device 207 to allow processor 202 access to the digital information on data storage medium 208 via bus 201.

Processor 202 may be any of a wide variety of general purpose processors or microprocessors such as the Pentium™ microprocessor manufactured by Intel™ Corporation or the Motorola™ 68040 or Power PC™ brand microprocessor manufactured by manufactured by Motorola™ Corporation. It will be apparent to those of ordinary skill in the art, however, that other varieties of processors may also be used in a particular computer system. Display device 205 may be a liquid crystal device, cathode ray tube (CRT), or other suitable display device. Mass storage device 207 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 208 may be a hard disk, a floppy disk, a CD-ROM, a magnetic tape, or other magnetic or optical data storage medium.

In general, processor 202 retrieves processing instructions and data from a data storage medium 208 using mass storage device 207 and downloads this information into random access memory 203 for execution. Processor 202, then executes an instruction stream from random access memory 203 or read-only memory 204. Command selections and information input at input device 206 are used to direct the flow of instructions executed by processor 202. Equivalent input device 206 may also be a pointing device such as a conventional mouse or trackball device. The results of this processing execution are then displayed on display device 205.

The preferred embodiment of the present invention is implemented as a software module, which may be executed on a computer system such as computer system 200 in a conventional manner. Using well known techniques, the application software of the preferred embodiment is stored on data storage medium 208 and subsequently loaded into and executed within computer system 200. Once initiated, the software of the preferred embodiment operates in the manner described below.

Figure 3:
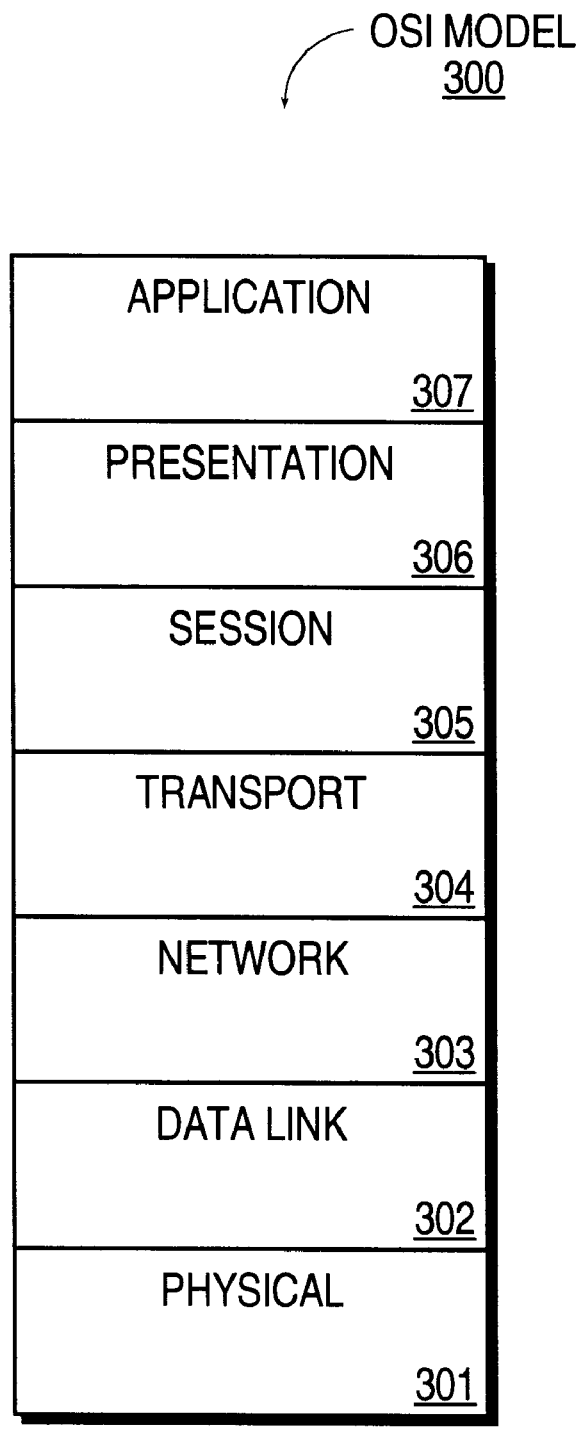
FIG. 3 illustrates the Open Systems Interconnection (OSI) Model.

FIG. 3 illustrates the Open Systems Interconnection (OSI) reference model. OSI Model 300 is an international standard that provides a common basis for the coordination of standards development, for the purpose of systems interconnection. The present invention is implemented to function as a routing switch within the "application layer" of the OSI model. The model defines seven layers, with each layer communicating with its peer layer in another node through the use of a protocol. Physical layer 301 is the lowest layer, with responsibility to transmit unstructured bits across a link. Data link layer 302 is the next layer above physical layer 301. Data link layer 302 transmits chunks across the link and deals with problems like checksumming to detect data corruption, orderly coordination of the use of shared media and addressing when multiple systems are reachable. Network bridges operate within data link layer 302.

Network layer 303 enables any pair of systems in the network to communicate with each other. Network layer 303 contains hardware units such as routers, that handle routing, packet fragmentation and reassembly of packets. Transport layer 304 establishes a reliable communication stream between a pair of systems, dealing with errors such as lost packets, duplicate packets, packet reordering and fragmentation. Session layer 305 offers services above the simple communication stream provided by transport layer 304. These services include dialog control and chaining. Presentation layer 306 provides a means by which OSI compliant applications can agree on representations for data. Finally, application layer 307 includes services such as file transfer, access and management services (FTAM), electronic mail and virtual terminal (VT) services. Application layer 307 provides a means for application programs to access the OSI environment. As described above, the present invention is implemented to function as a routing switch in application layer 307. Application layer routing creates an open channel for the management, and the selective flow of data from remote databases on a network.

A. Overview

FIG. 4A illustrates conceptually the user value chain as it exists today. The user value chain in FIG. 4A depicts the types of transactions that are performed today, and the channels through which the transactions are performed. A "transaction" for the purposes of the present invention includes any type of commercial or other type of interaction that a user may want to perform. Examples of transactions include a deposit into a bank account, a request for a loan from a bank, a purchase of a car from a car dealership or a purchase of a car with financing from a bank. A large variety of other transactions are also possible.

A typical user transaction today may involve user 100 walking into a bank or driving up to a teller machine, and interacting with a live bank teller, or automated teller machine (ATM) software applications. Alternatively, user 100 can perform the same transaction by using a personal computer (PC), activating application software on his PC to access his bank account, and dialing into the bank via a modem line. If user 100 is a Web user, however, there is no current mechanism for performing a robust, real-time transaction with the bank, as illustrated in FIG. 4A. CGI scripts provide only limited two-way capabilities, as described above. Thus, due to this lack of a robust mechanism by which real-time Web transactions can be performed, the bank is unable to be a true "Web merchant," namely a merchant capable of providing complete transactional services on the Web.

According to one embodiment of the present invention, as illustrated in FIG. 4B, each merchant that desires to be a Web merchant can provide real-time transactional capabilities to users who desire to access the merchants' services via the Web. This embodiment includes a service network running on top of a facilities network, namely the Internet, the Web or e-mail networks. For the purposes of this application, users are described as utilizing PC's to access the Web via Web server "switching" sites. (Switching is described in more detail below). Users may also utilize other personal devices such as network computers or cellular devices to access the merchants' services via appropriate switching sites. These switching sites include non-Web network computer sites and cellular provider sites. Five components interact to provide this service network functionality, namely an exchange, an operator agent, a management agent, a management manager and a graphical user interface. All five components are described in more detail below.

Figure 5A:
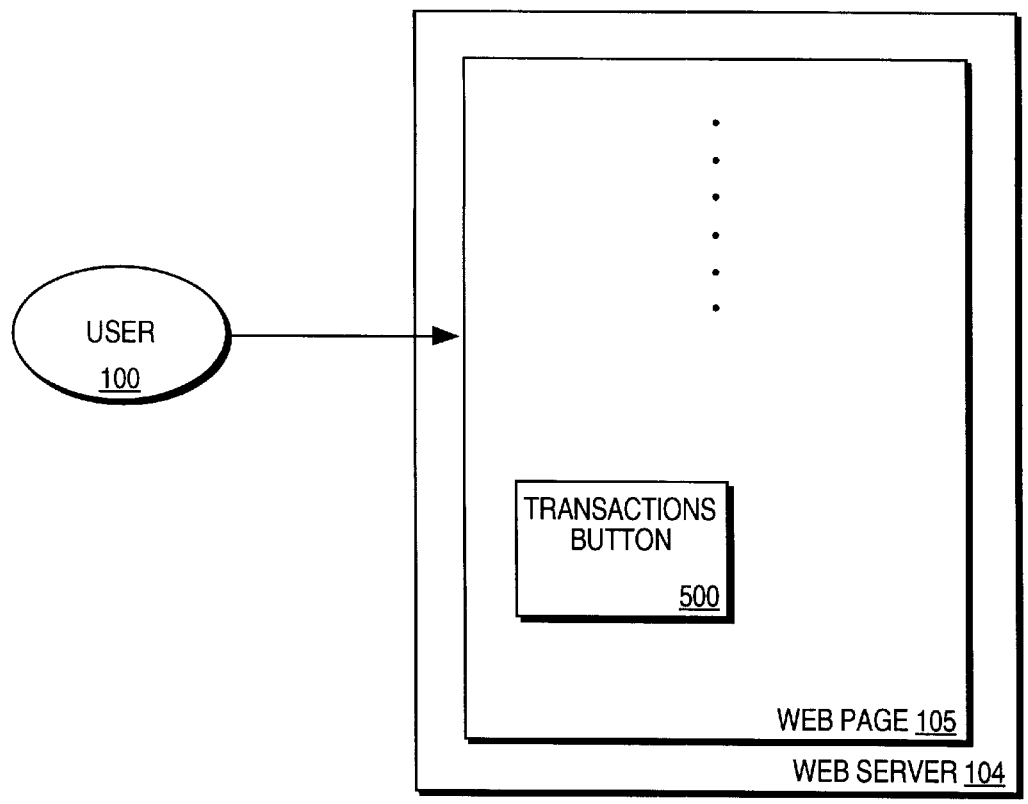
FIG. 5A illustrates a user accessing a Web server including one embodiment of the present invention.

As illustrated in FIG. 5A, user 100 accesses Web server 104. Having accessed Web server 104, user 100 can decide that he desires to perform real-time transactions. When Web server 104 receives user 100's indication that he desires to perform real-time transactions, the request is handed over to an exchange component. Thus, from Web page 105, for example, user 100 can select button 500, entitled "Transactions" and Web server 104 hands user 100's request over to the exchange component. The button and the title can be replaced by any mechanism that can instruct a Web server to hand over the consumer's request to the exchange component.

Figure 5B:
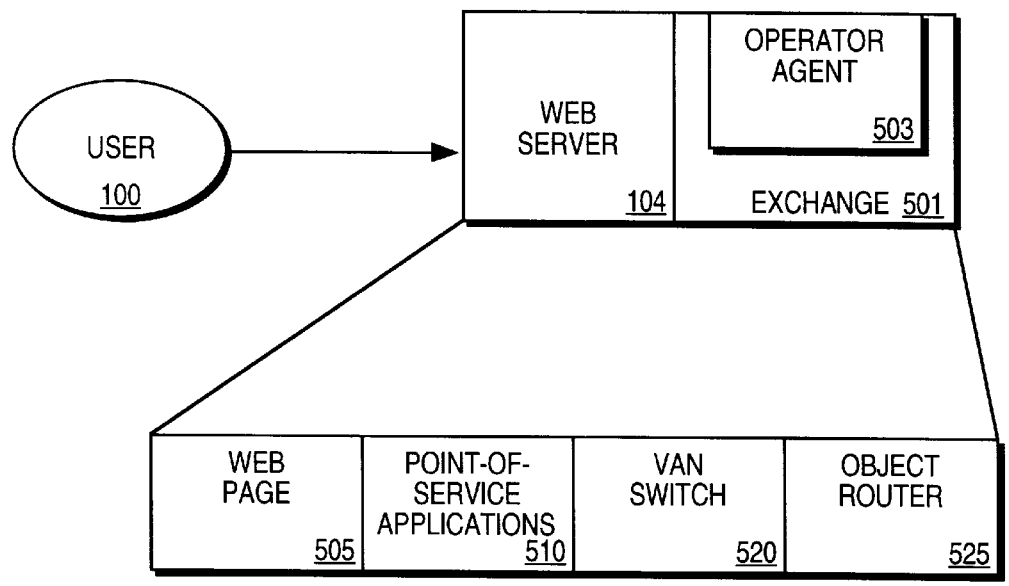
FIG. 5B illustrates the exchange component according to one embodiment of the present invention.

FIG. 5B illustrates exchange 501. Exchange 501 comprises Web page 505 and point-of-service (POSvc) applications 510. Exchange 501 also conceptually includes a switching component and an object routing component (described in more detail below). POSvc applications 510 are transactional applications, namely applications that are designed to incorporate and take advantage of the capabilities provided by the present invention. Although exchange 501 is depicted as residing on Web server 104, the exchange can also reside on a separate computer system that resides on the Internet and has an Internet address. Exchange 501 may also include operator agent 503 that interacts with a management manager (described in more detail below). Exchange 501 creates and allows for the management (or distributed control) of a service network, operating within the boundaries of an IP-based facilities network. Thus, exchange 501 and a management agent component, described in more detail below, under the headings "VAN Switch and Object Routing," together perform the switching, object routing, application and service management functions according to one embodiment of the present invention.

Exchange 501 processes the consumer's request and displays an exchange Web page 505 that includes a list of POSvc applications 510 accessible by exchange 501. A POSvc application is an application that can execute the type of transaction that the user may be interested in performing. The POSvc list is displayed via the graphical user interface component. One embodiment of the present invention supports HyperText Markup Language as the graphical user interface component. Virtual Reality Markup Language and Java™ are also supported by this embodiment. A variety of other graphical user interface standards can also be utilized to implement the graphical user interface.

Figure 5C:
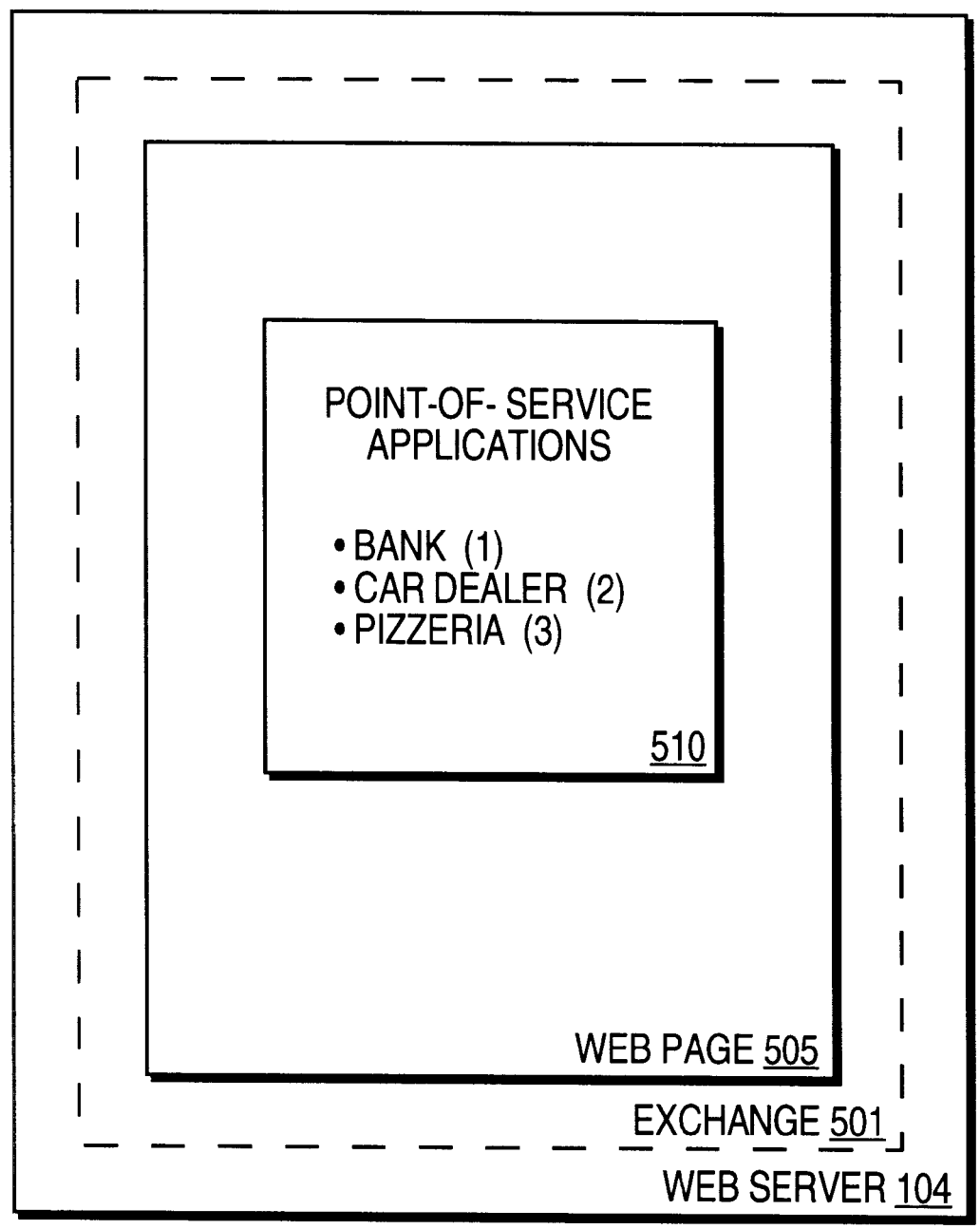
FIG. 5C illustrates an example of a point-of-service (POSvc) application list.
Figure 5D:
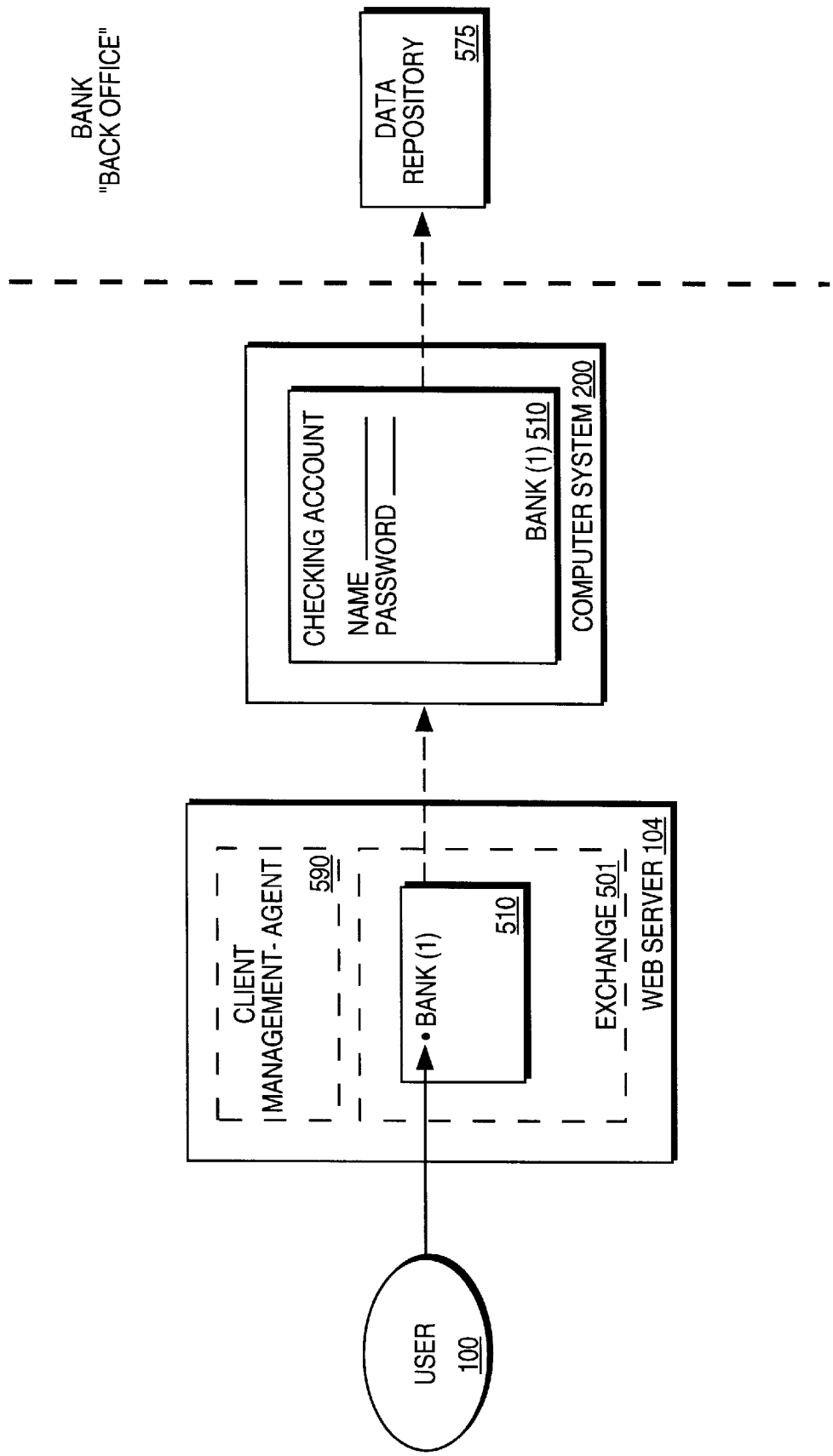
FIG. 5D illustrates a user selecting a bank POSvc application from the POSvc application list.

An example of a POSvc application list is illustrated in FIG. 5C. User 100 can thus select from POSvc applications Bank 510(1), Car Dealer 510(2) or Pizzeria 510(3). Numerous other POSvc applications can also be included in this selection. If user 100 desires to perform a number of banking transactions, and selects the Bank application, a Bank POSvc application will be activated and presented to user 100, as illustrated in FIG. 5D. For the purposes of illustration, exchange 501 in FIG. 5D is shown as running on a different computer system (Web server 104) from the computer systems of the Web merchants running POSvc applications (computer system 200). Exchange 501 may, however, also be on the same computer system as one or more of the computer systems of the Web merchants.

Once Bank POSvc application 510 has been activated, user 100 will be able to connect to Bank services and utilize the application to perform banking transactions, thus accessing data from a host or data repository 575 in the Bank "Back Office." The Bank Back Office comprises legacy databases and other data repositories that are utilized by the Bank to store its data. This connection between user 100 and Bank services is managed by exchange 501. As illustrated in FIG. 5D, once the connection is made between Bank POSvc application 510(1), for example, and Bank services, an operator agent on Web server 104 may be activated to ensure the availability of distributed functions and capabilities.

Each Web merchant may choose the types of services that it would like to offer its clients. In this example, if Bank decided to include in their POSvc application access to checking and savings accounts, user 100 will be able to perform real-time transactions against his checking and savings accounts. Thus, if user 100 moves $500 from his checking account into his savings account, the transaction will be performed in real-time, in the same manner the transaction would have been performed by a live teller at the bank or an ATM machine. Therefore, unlike his prior access to his account, user 100 now has the capability to do more than browse his bank account. The ability to perform these types of robust, real-time transactions from a Web client is a significant aspect of the present invention.

Figure 5E:
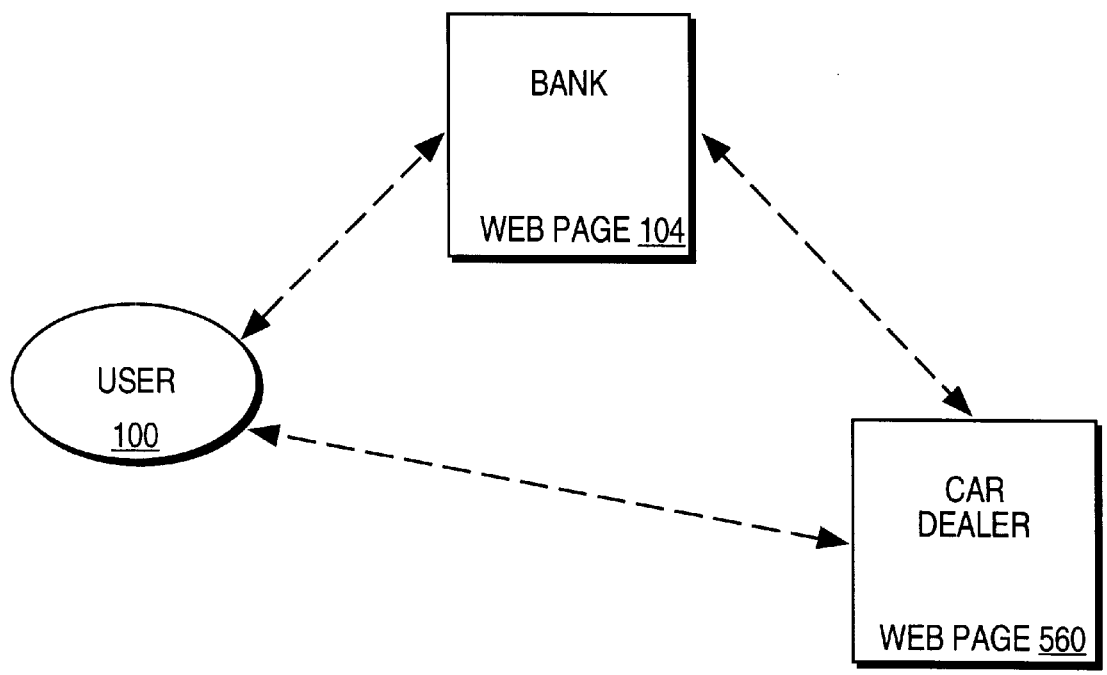
FIG. 5E illustrates a three-way transaction according to one embodiment of the present invention.

Bank can also decide to provide other types of services in POSvc application 510(1). For example, Bank may agree with Car dealership to allow Bank customers to purchase a car from that dealer, request a car loan from Bank, and have the entire transaction performed on the Web, as illustrated in FIG. 5E. In this instance, the transactions are not merely two-way, between the user and Bank, but three-way, amongst the consumer, Bank and Car dealership. According to one aspect of the present invention, this three-way transaction can be expanded to n-way transactions, where n represents a predetermined number of merchants or other service providers who have agreed to cooperate to provide services to users. The present invention therefore allows for "any-to-any" communication and transactions on the Web, thus facilitating a large, flexible variety of robust, real-time transactions on the Web.

Finally, Bank may also decide to provide intra-merchant or intra-bank services, together with the inter-merchant services described above. For example, if Bank creates a POSvc application for use by the Bank Payroll department, Bank may provide its own employees with a means for submitting timecards for payroll processing by the Bank's Human Resources (HR) Department. An employee selects the Bank HR POSvc application, and submits his timecard. The employee's timecard is processed by accessing the employee's payroll information, stored in the Bank's Back Office. The transaction is thus processed in real-time, and the employee receives his paycheck immediately.

B. Van Switching and Object Routing

Figure 6A:
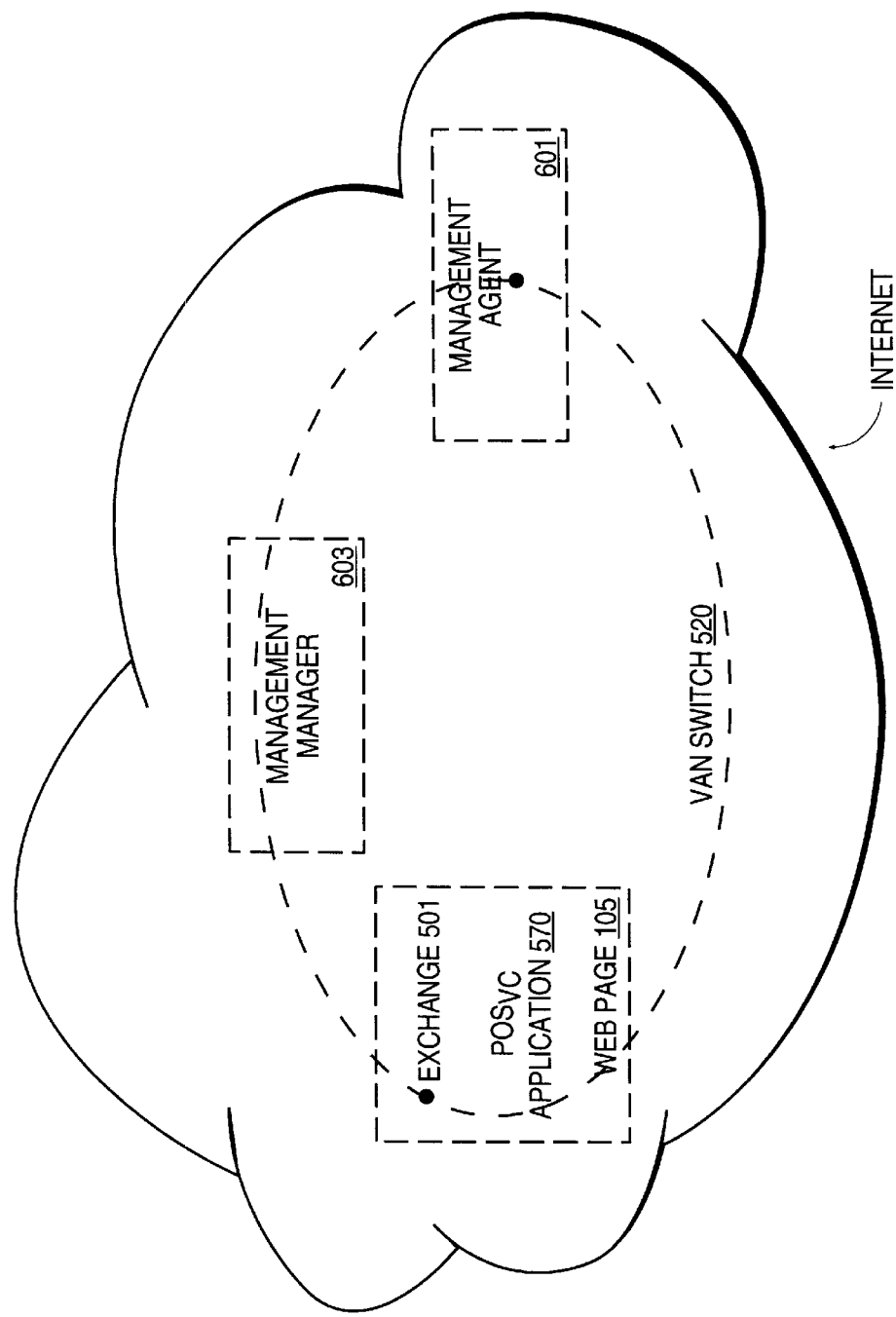
FIG. 6A illustrates a value-added network (VAN) switch.

As described above, exchange 501 and management agent 601, illustrated in FIG. 6A, together constitute a value-added network (VAN) switch. These two elements may take on different roles as necessary, including peer-to-peer, client-server or master-slave roles. Management manager 603 is illustrated as residing on a separate computer system on the Internet. Management manager 603 can, however, also reside on the same machine as exchange 501. Management manager 603 interacts with the operator agent 503 residing on exchange 501.

VAN switch 520 provides multi-protocol object routing, depending upon the specific VAN services chosen. This multi-protocol object routing is provided via a proprietary protocol, TransWeb™ Management Protocol (TMP). TMP incorporates the same security features as the traditional Simple Network Management Protocol, SNMP. It also allows for the integration of other traditional security mechanisms, including RSA security mechanisms.

One embodiment of the present invention utilizes TMP and distributed on-line service information bases (DOLSIBs) to perform object routing. Alternatively, TMP can incorporate s-HTTP, Java™, the WinSock API or ORB with DOLSIBs to perform object routing. DOLSIBs are virtual information stores optimized for networking. All information entries and attributes in a DOLSIB virtual information store are associated with a networked object identity. The networked object identity identifies the information entries and attributes in the DOLSIB as individual networked objects, and each networked object is assigned an Internet address. The Internet address is assigned based on the IP address of the node at which the networked object resides.

Figure 6B:
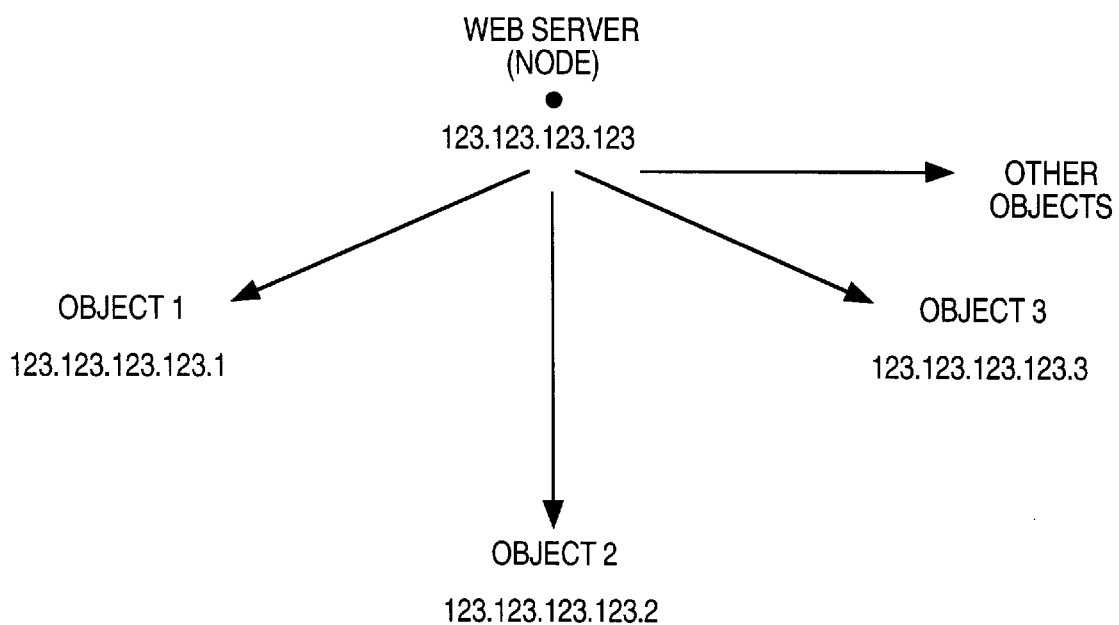
FIG. 6B illustrates the hierarchical addressing tree structure of the networked objects in DOLSIBs.

For example, in FIG. 5A, Web server 104 is a node on the Internet, with an IP address. All networked object associated with Web server 104 will therefore be assigned an Internet address based on the Web server 104's IP address. These networked objects thus "branch" from the node, creating a hierarchical tree structure. The Internet address for each networked object in the tree essentially establishes the individual object as an "IP-reachable" or accessible node on the Internet. TMP utilizes this Internet address to uniquely identify and access the object from the DOLSIB. FIG. 6B illustrates an example of this hierarchical addressing tree structure.

Each object in the DOLSIB has a name, a syntax and an encoding. The name is an administratively assigned object ID specifying an object type. The object type together with the object instance serves to uniquely identify a specific instantiation of the object. For example, if object 610 is information about models of cars, then one instance of that object would provide user 100 with information about a specific model of the car while another instance would provide information about a different model of the car. The syntax of an object type defines the abstract data structure corresponding to that object type. Encoding of objects defines how the object is represented by the object type syntax while being transmitted over the network.

C. Management and Administration

Figure 7:
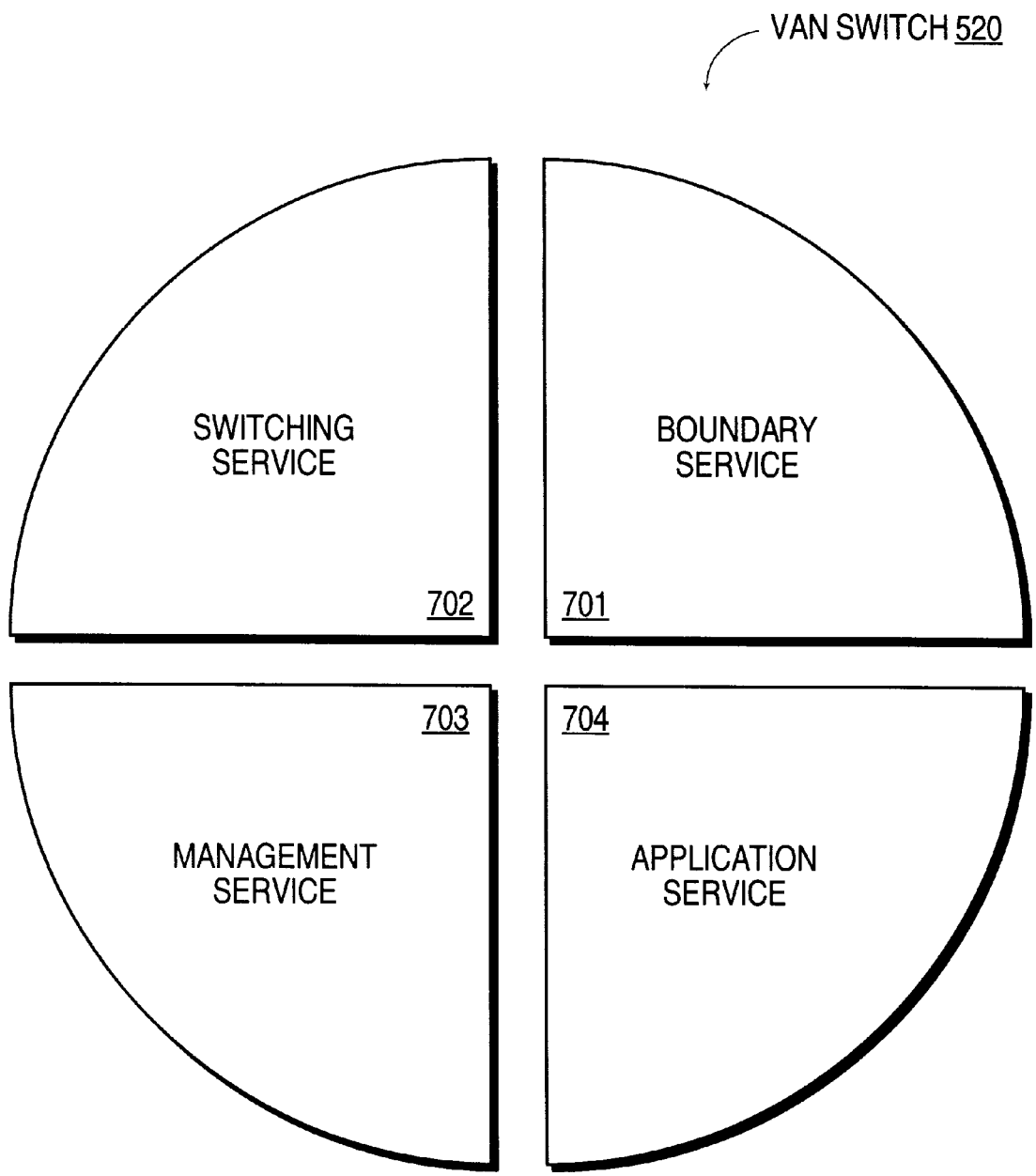
FIG. 7 illustrates conceptually the layered architecture of a VAN switch.

As described above, exchange 501 and management agent 601 together constitute a VAN switch. FIG. 7 illustrates conceptually the layered architecture of VAN switch 520. Specifically, boundary service 701 provides the interfaces between VAN switch 520, the Internet and the Web, and multi-media end user devices such as PCs, televisions or telephones. Boundary service 701 also provides the interface to the on-line service provider. A user can connect to a local application, namely one accessible via a local VAN switch, or be routed or "switched" to an application accessible via a remote VAN switch.

Switching service 702 is an OSI application layer switch. Switching service 702 thus represents the core of the VAN switch. It performs a number of tasks including the routing of user connections to remote VAN switches, described in the paragraph above, multiplexing and prioritization of requests, and flow control. Switching service 702 also facilitates open systems' connectivity with both the Internet (a public switched network) and private networks including back office networks, such as banking networks. Interconnected application layer switches form the application network backbone. These switches are one significant aspect of the present invention.

Management service 703 contains tools such as Information Management Services (IMS) and application Network Management Services (NMS). These tools are used by the end users to manage network resources, including VAN switches. Management service 703 also provides applications that perform Operations, Administration, Maintenance & Provisioning (OAM&P) functions. These OAM&P functions include security management, fault management, configuration management, performance management and billing management. Providing OAM&P functions for applications in this manner is another significant aspect of the present invention.

Finally, application service 704 contains application programs that deliver customer services. Application service 704 includes POSvc applications such as Bank POSvc described above, and illustrated in FIG. 6A. Other examples of VAN services include multi-media messaging, archival/ retrieval management, directory services, data staging, conferencing, financial services, home banking, risk management and a variety of other vertical services. Each VAN service is designed to meet a particular set of requirements related to performance, reliability, maintenance and ability to handle expected traffic volume. Depending on the type of service, the characteristics of the network elements will differ. VAN service 704 provides a number of functions including communications services for both management and end users of the network and control for the user over the user's environment.

Figure 8:
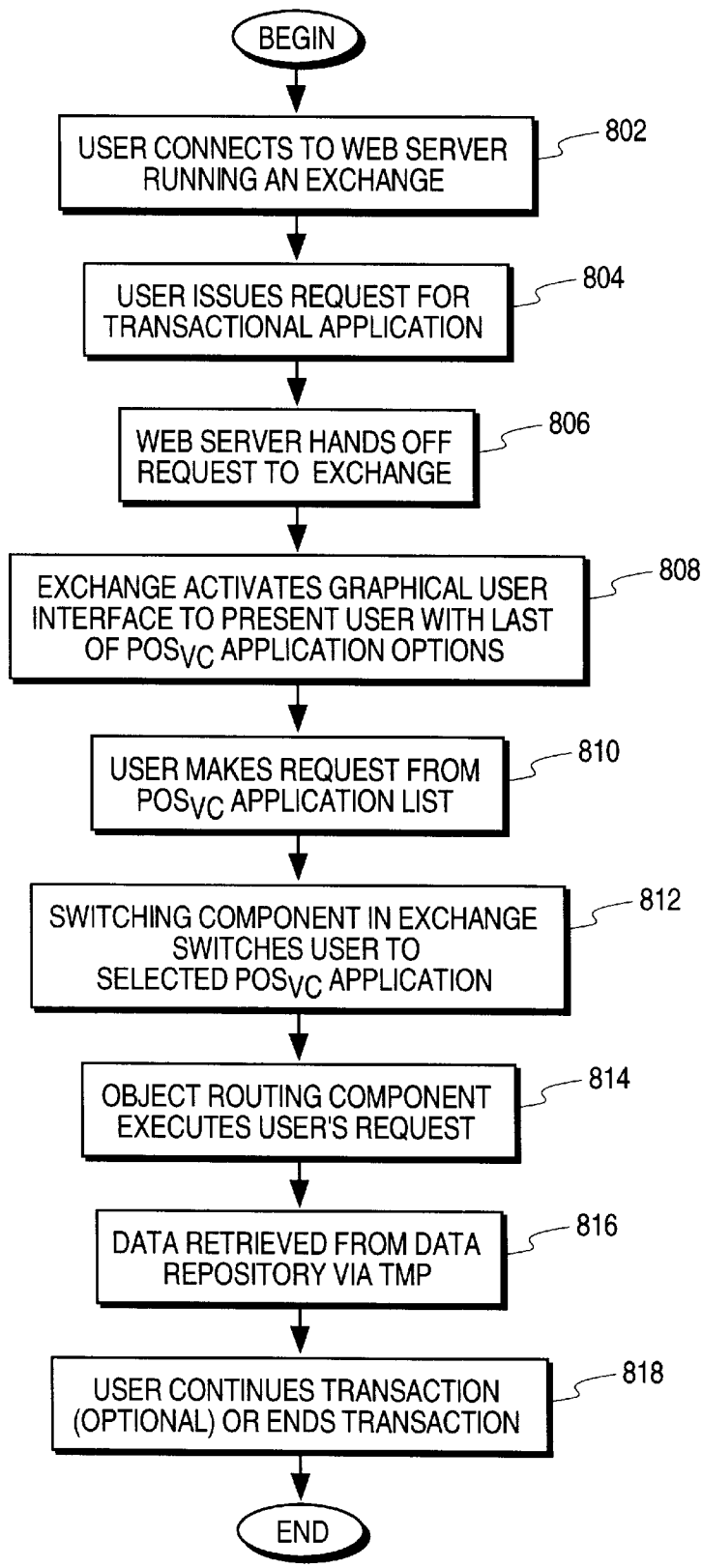
FIG. 8 is a flow diagram illustrating one embodiment of the present invention.

FIG. 8 is a flow diagram illustrating one embodiment of the present invention. A user connects to a Web server running an exchange component in step 802. In step 804, the user issues a request for a transactional application, and the web server hands off the request to an exchange in step 806. The exchange activates a graphical user interface to present user with a list of POSvc application options in step 808. In step 810, the user makes a selection from the POSvc application list. In step 812, the switching component in the exchange switches the user to the selected POSvc application, and in step 814, the object routing component executes the user's request. Data is retrieved from the appropriate data repository via TMP in step 816, and finally, the user may optionally continue the transaction in step 818 or end the transaction.

Thus, a configurable value-added network switching and object routing method and apparatus is disclosed. These specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

We claim:

1. A configurable value-added network switch for enabling real-time transactions on a network, said configurable value-added network switch compromising:

means for switching to a transactional application in response to a user specification from a network application, said transactional application providing a user with a plurality of transactional services managed by at least one value-added network service provider, said value-added network service provider keeping a transaction flow captive, said plurality of transactional services being performed interactively and in real time;

means for transmitting a transaction request from said transactional application; and means for processing said transaction request.

2. The configurable value-added network switch as claimed in claim 1 wherein said means for switching to a transactional application further comprises:

means for receiving said user specification;

means for enabling a switch to said transactional application; and means for activating said transactional application.

3. The configurable value-added network switch as claimed in claim 2 wherein said means for activating said transactional application further includes means for creating a transaction link between said network application and said transactional application.

4. The configurable value-added network switch as claimed in claim 2 wherein said means for receiving said user specification further comprises:

means for presenting said user with a list of transactional applications, each of said transactional application being associated with a particular value-added network service provider; and means for submitting said user specification according to a user's selection of said transactional application from said list of transactional applications.

5. The configurable value-added network switch as claimed in claim 1 wherein said means for processing said transaction request further comprises means for coupling said means for transmitting to a host means.

6. The configurable value-added network switch as claimed in claim 5 wherein said host means contains data corresponding to said transaction request.

7. The configurable value-added network switch as claimed in claim 1 wherein said value-added network service providers cooperating to provide said plurality of transactional services to users.

8. The configurable value-added network switch as claimed in claim 1 further comprising means for controlling and prioritizing multiple transaction requests initiated by various users.

9. The configurable value-added network switch as claimed in claim 1 further comprising means for providing security management, fault management, configuration management, performance management and billing management.

10. A method for configuring a value-added network switch for enabling real-time transactions on a network, said method for configuring said value-added network switch compromising the steps of:

switching to a transactional application in response to a user specification from a network application, said transactional application providing a user with a plurality of transactional services managed by at least one value-added network service provider, said value-added network service provider keeping a transaction flow captive, said plurality of transactional services being performed interactively and in real time;

transmitting a transaction request from said transactional application; and processing said transaction request.

11. The method for configuring said value-added network switch as claimed in claim 10 wherein said step of switching to a transactional application further comprises the steps of:

receiving said user specification;

enabling a switch to said transactional application; and activating said transactional application.

12. The method for configuring said value-added network switch as claimed in claim 11 wherein said step of activating said transactional application further includes a step of creating a transaction link between said network application and said transactional application.

13. The method for configuring said value-added network switch as claimed in claim 11 further comprising the steps of:

controlling security;

performing fault management;

providing configuration management;

managing performance; and enabling billing management.

14. The method for configuring said value-added network switch as claimed in claim 11 wherein said step of receiving said user specification further comprises steps of:
- presenting said user with a list of transactional applications, each of said transactional application being associated with a particular Internet service provider; and
- submitting said user specification according to a user's selection of said transactional application from said list of transactional applications.

15. The method for configuring said value-added network switch as claimed in claim 10 wherein said step of processing said transaction request further comprises the step of transmitting said transaction request to a host means.

16. The method for configuring said value-added network switch as claimed in claim 15 wherein said host means contains data corresponding to said transaction request.

17. The method for configuring said value-added network switch as claimed in claim 10 wherein said value-added network service providers cooperate to provide said plurality of transactional services to said user.

18. The method for configuring said value-added network switch as claimed in claim 10 further comprising the step of controlling and prioritizing multiple transaction requests initiated by various users.

19. A method for enabling object routing on a network, said method for enabling object routing comprising the steps of:
- associating an object identity with information entries and attributes, wherein the object identity represents a networked object;
- storing said information entries and said attributes in a virtual information store; and
- assigning a unique network address to said object identity.

20. The method in claim 19 wherein said step of associating said object identity with said information entries and said attributes in said virtual information store further includes the step of associating a name, a syntax and an encoding for said object identity.

21. The method in claim 20 wherein said name associated with said object identity specifies an object type.

22. The method in claim 21 wherein said object type and an object instance uniquely identify an instantiation of said object type.

23. The method in claim 22 wherein said syntax defines a data structure for said object type.

24. The method in claim 19 further comprising the step of utilizing said unique network address to identify and route said object identity on the network.

25. The method in claim 19 further comprising the step of utilizing said unique network address to identify and route said object identity on the Internet.

26. The method in claim 19 further comprising the step of utilizing said unique network address of said object identity to perform Operations, Administration, Maintenance & Provisioning (OAM&P) functions.

27. An object router on a network, said object router comprising:
- means for associating an object identity with information entries and attributes, wherein the object identity represents a networked object;
- means for storing said information entries and said attributes in a virtual information store; and
- means for assigning a unique network address to said object identity.

28. The object router in claim 27 wherein said means for associating said object identity with said information entries and said attributes in said virtual information store further includes means for associating a name, a syntax and an encoding for said object identity.

29. The object router in claim 28 wherein said name of said object identity specifies an object type.

30. The object router in claim 29 wherein said object type and an object instance uniquely identify an instantiation of said object type.

31. The object router in claim 30 wherein said syntax defines a data structure for said object type.

32. The object router in claim 27 further comprising means for utilizing said unique network address to identify and route said object identity on the network.

33. The object router in claim 27 further comprising means for utilizing said unique network address to identify and route said object identity on the Internet.

34. The object router in claim 27 further comprising the step of utilizing said unique network address of said object identity to perform Operations, Administration, Maintenance & Provisioning (OAM&P) functions.

35. A configurable value-added network system for enabling real-time transactions on a network, said configurable value-added network system comprising:
- means for switching to a transactional application in response to a user specification from a network application, said transactional application providing a user with a plurality of transactional services managed by at least one value-added network service provider, said value-added network service provider keeping a transaction flow captive, said plurality of transactional services being performed interactively and in real time;
- means for activating an agent to create a transaction link between said user application and said transactional application;
- means for transmitting a transaction request from said transactional application; and
- a host means for processing said transaction request and retrieving data corresponding to said transaction request.

* * * * *